United States Patent

Taylor

[11] Patent Number: 5,907,532
[45] Date of Patent: May 25, 1999

[54] DATA DISC HANDLING, STORAGE, AND RETRIEVAL APPARATUS AND METHOD

[76] Inventor: Vincent F. Taylor, 3 Leon Way, Rancho Mirage, Calif. 92270

[21] Appl. No.: 08/843,703

[22] Filed: Apr. 16, 1997

Related U.S. Application Data

[63] Continuation of application No. 08/524,389, Sep. 6, 1995, abandoned.

[51] Int. Cl.⁶ .............................. G11B 17/04; G11B 17/22
[52] U.S. Cl. .............................. 369/192; 369/36; 369/178
[58] Field of Search .................................. 369/34, 36, 38, 369/39, 178, 191–194; 360/92

[56] References Cited

U.S. PATENT DOCUMENTS

| | | | |
|---|---|---|---|
| 3,848,264 | 11/1974 | Wilson | 360/92 |
| 4,502,133 | 2/1985 | Siryji et al. | 369/34 |
| 4,607,354 | 8/1986 | Ishibashi et al. | 369/39 |
| 4,610,008 | 9/1986 | Ishibashi et al. | 369/34 |
| 4,633,452 | 12/1986 | Shimbo | 369/39 |
| 4,635,150 | 1/1987 | Kato et al. | 360/98.06 |
| 4,695,990 | 9/1987 | Kawakami | 369/38 |
| 4,817,071 | 3/1989 | Carlson et al. | 369/36 |
| 4,891,720 | 1/1990 | Grant et al. | 360/92 |
| 5,022,019 | 6/1991 | Motoyoshi et al. | 369/36 |
| 5,136,562 | 8/1992 | Staar | 369/36 |
| 5,274,620 | 12/1993 | Sipos | 369/77.2 |
| 5,335,218 | 8/1994 | Osada | 369/178 |
| 5,446,706 | 8/1995 | Naito | 369/13 |

Primary Examiner—William J Klimowicz
Attorney, Agent, or Firm—Christie, Parker & Hale, LLP

[57] ABSTRACT

A data disc handling, storage, and retrieval apparatus and method therefor is disclosed which utilizes parallel storage racks and a parallel bank of data disc drives with a transport assembly for transferring data discs between the storage racks and the disc drives. The transport assembly includes two clamps oriented back to back and a lifting arm to raise the discs out of the storage racks to the clamps.

7 Claims, 5 Drawing Sheets

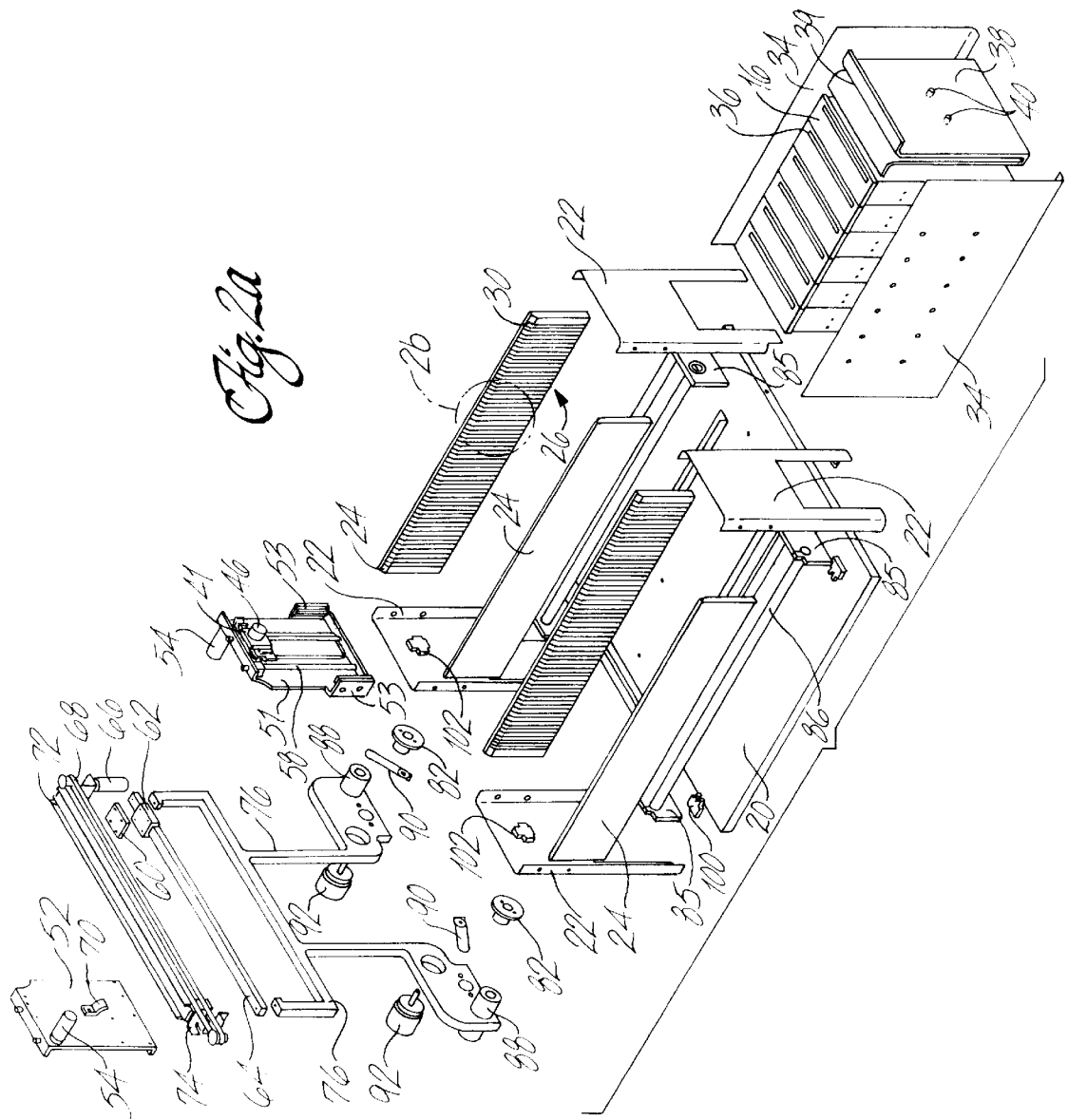

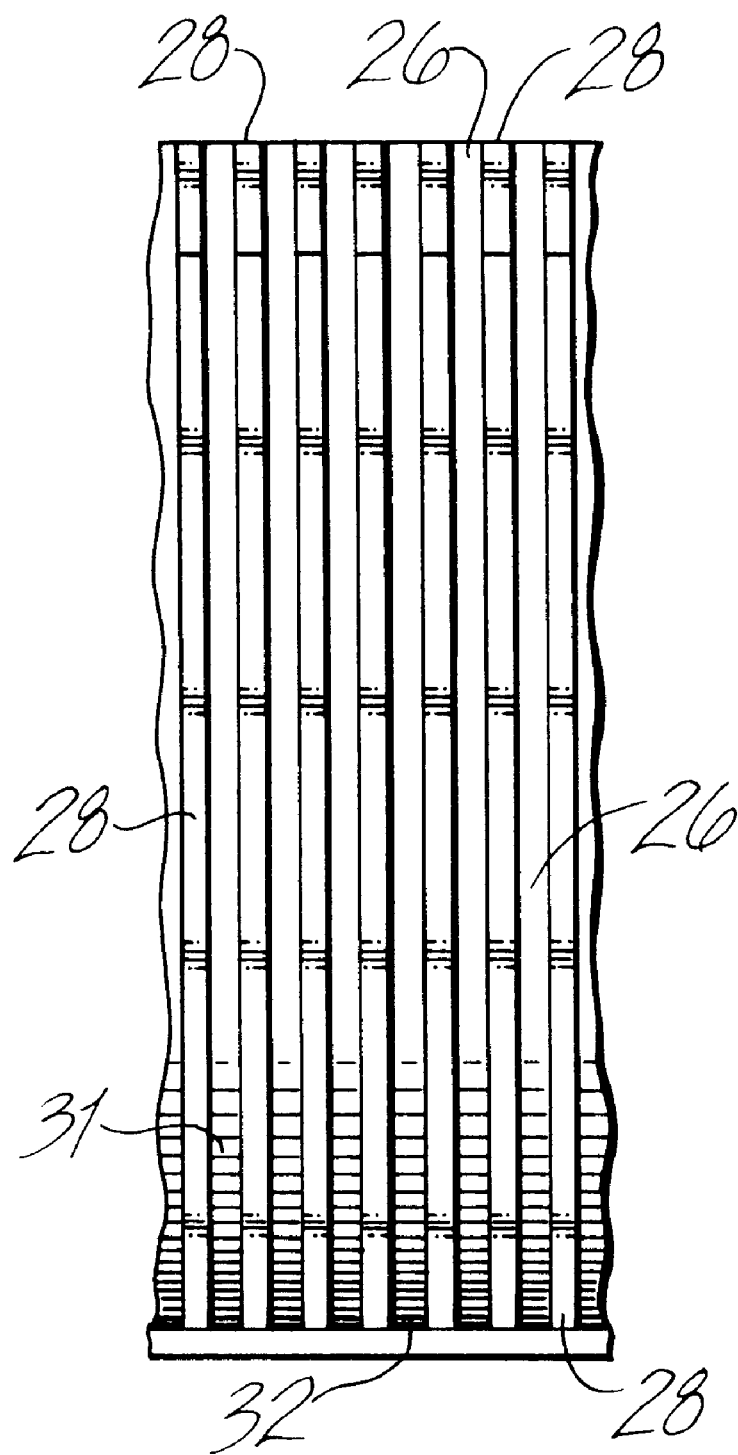

DATA DISC HANDLING, STORAGE, AND RETRIEVAL APPARATUS AND METHOD

CROSS-REFERENCE TO RELATED APPLICATIONS

This application is a continuation of patent application Ser. No. 08/524,389 filed Sep. 6, 1995, now abandoned.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyrights whatsoever.

BACKGROUND OF THE INVENTION

This invention relates to disc handling, retrieval, and storage devices.

The technique of storing information on a diskette, cassette, or other storage unit has long been known. For example, a musical selection may be recorded in a groove on a vinyl disc and replayed by conventional phonographic techniques. Other examples include 8 track and cassette tapes, floppy discs or diskettes, and hard disks for storing digital data in a magnetic form which can be read with appropriate magnetic sensors. More recently, optical and capacitive discs have been developed which store information in a form which can be retrieved optically or capacitively. The optical disc are sometimes referred to as laser discs because they can be read with light emitted by a laser, or they are referred to as a compact disc because of the amount of information that can be stored on a single, relatively small disc. Because of the information storage capacity of optically based digital data available on discs, it has become feasible to store both audio and video information on a disc.

The audio compact disc is a rigid plastic disc of about 4.7 inches in diameter with a concentric 0.06 inch diameter hole. Video discs can be larger, and other types of discs vary in size from these two types. Also in use today are optically based disc systems for use as digital storage devices for computers, known as CD ROM devices, where CD ROM stands for compact disc read only memory. Further, recordable discs are available which can be written to. In addition to audio and video information, data discs have been used to store many types of information including encyclopedias, scientific monographs, catalogs of books, old news reels, and collections of raw data to name only a few. All of these types of discs will be referred to herein as data discs or simply discs.

A single sided data disk can store over 1 gigabyte of data. Therefore, systems have been developed allowing more than one user to access information on a single data disc. Some data disc systems are available that access multiple data discs. For example, up to a dozen or so compact discs are loaded into a magazine, which is then inserted into a disc player. When a data disc is selected for retrieval or play, a loading mechanism loads the data disc onto the play mechanism or disc drive of the disc player. When another data disc is selected, the first disc must be unloaded from the disc drive and reinserted into the magazine before the next data disc can be loaded into the disc drive.

Other systems have been provided where multiple disc drives are available to access and play multiple discs for different zones or output terminals. The automated systems currently available for storing and retrieving data discs have, however, been subject to certain limitations and disadvantages.

Space for storage of data discs is one consideration. Even though the data disc can store an extremely large amount of information, it is easy to build a large library of data discs. A large library of music data discs, for example, is quickly collected. In the past, the discs have been handled inside of caddies which are enclosures with a movable door to allow access to the disc. The caddie is typically six times the thickness of a disc. Thus, eliminating caddies is a significant advancement. Systems for the storage, retrieval, handling, and play of music data discs in multiple juke boxes, even if a caddie is not used, are large and bulky and, thus, have little application in private homes in which items larger than stereo components are undesirable. Further, available commercial systems for the storage, retrieval, and handling of data discs are too large to fit in standard size commercial component racks.

Storing discs close enough together to reduce the size of the system creates difficulty in handling the discs. For example, there is not enough room to securely grasp the discs, and positioning the disc accurately for placement in a small storage area requires fine adjustments. Consistent retrieval and replacement of data discs from and into a storage area small enough to substantially reduce the size of a system, has not been obtained. At times, discs are only partially inserted into a storage position. The internal moving parts, usually a disc transport assembly, of the system then strike the disc and damage or break it.

This problem is accentuated by orienting the disc drives differently then the storage rack, so that the discs must be rotated or turned relative to the storage and play orientations of the discs. Rotating the data discs requires extra space and increases the possibility of slight errors in placement. Handling discs in a horizontal plane also increases the possibility of slight errors in placement because gravity acts downwardly on the disc to remove the disc from the horizontal place. Movement of the storage rack in which the data discs are stored can also introduce error into disc placement. Moving such a relatively large mass having a relatively large inertia makes it difficult to finely adjust the position of the discs. Further, movement of the storage rack reduces the speed at which discs can be accessed because the heavy rack cannot be subjected to high acceleration, and the rack must be repositioned for the retrieval of each disc.

Thus, increasing the number of data discs storable in a given area and the consistency of retrieval and placement of data discs is desirable to make data disc storage, retrieval, and handling devices more reliable and feasible for home and public use.

SUMMARY OF THE INVENTION

There is, therefore, provided in the practice of this invention a novel apparatus for handling data discs comprising a support frame with a plurality of storage racks and a bank of disc drives attached to the support frame. A transport assembly transports discs between the storage racks and the disc drives and is driven by a transport drive mechanism. The storage racks and the bank of disc drives are substantially parallel.

In a preferred embodiment of the invention, the storage racks and drives are stationary and oriented to receive discs vertically. The transport assembly comprises a plurality of vertically translating clamps which are mounted back to back on the transport assembly. A lifter arm is included to lift the discs partially out of storage slots, so that they can be grasped by the clamps. The transport assembly also includes at least one guide channel to aid the accurate placement of data discs in the drives and in storage slots. The transport drive mechanism utilizes at least one worm drive for translating the transport assembly, and at least one guide rod with a linear bearing movably mounted thereon. The bearing has a footprint length less than three inches. The apparatus in the preferred embodiment further includes a loading tray for receiving discs to be added to the storage racks.

In another embodiment of the invention, a method for handling, storing, and retrieving discs includes storing discs in substantially parallel storage racks, clamping the discs with a clamp, translating the discs out of the storage rack, and inserting the discs into a drive that is substantially parallel to the storage racks.

In a preferred embodiment of the method, the discs are lifted with a lifter arm, and a transport assembly translates horizontally to required positions above the storage racks and disc drives. After the clamp inserts the disc into the disc drive, the clamp releases the disc and then pushes the disc farther into the drive.

In an alternate embodiment of the method, a dual clamping arrangement is utilized to change the disc in a single drive without having to return the first disc to the storage rack before inserting a second disc into the drive.

These and other features and advantages of the present invention will appear from the following Detailed Description and the accompanying drawings in which similar reference characters denote similar elements throughout the several views.

BRIEF DESCRIPTION OF THE DRAWINGS

FIG. 2a is an exploded perspective view of the apparatus of FIG. 1;

FIG. 2b is an enlarged partial view of the slots of

FIG. 2a taken from inside circle 2b;

DETAILED DESCRIPTION

Figure 1:
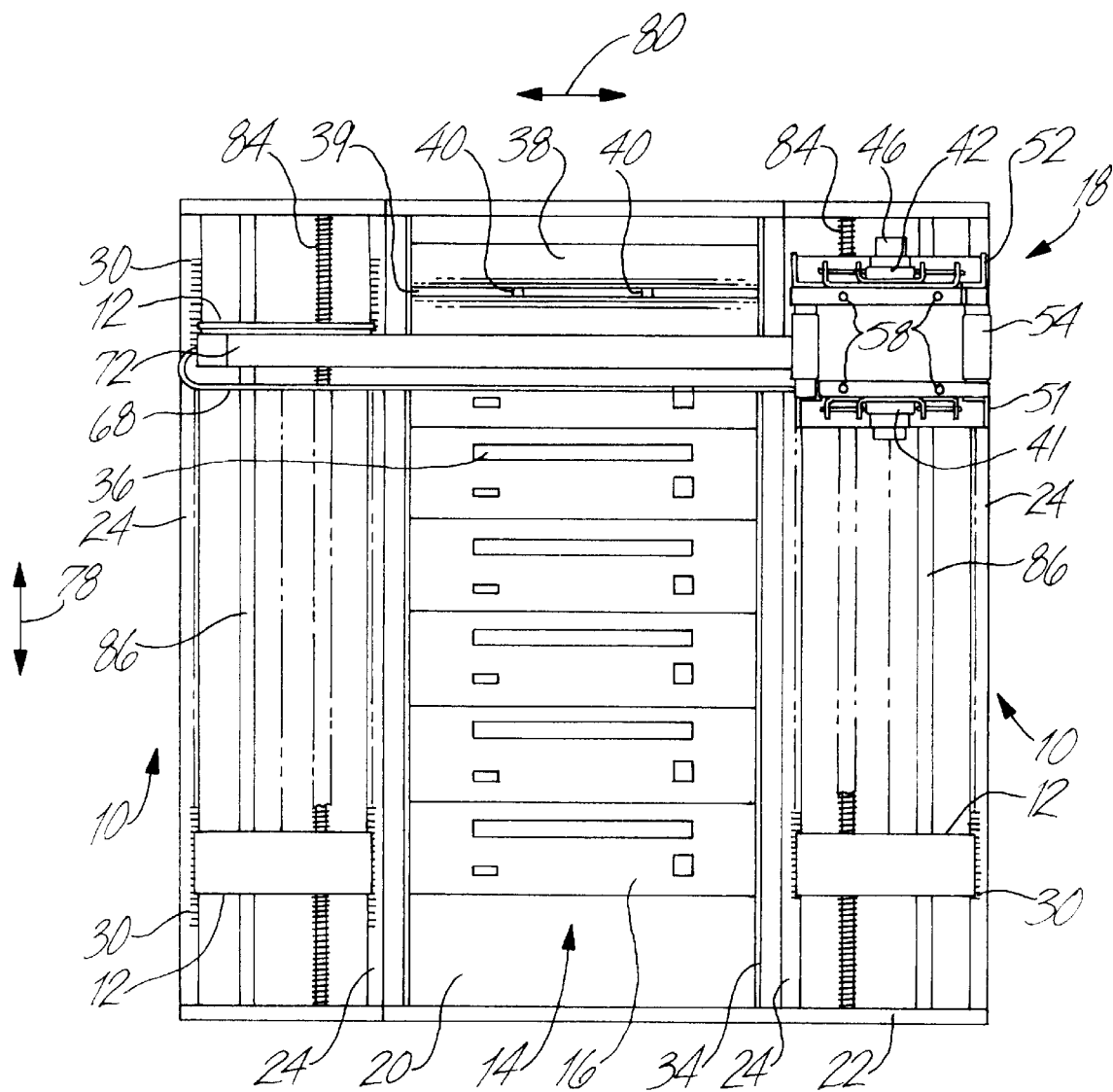
FIG. 1 is a schematic top view of the data discs handling, storage, and retrieval apparatus according to the present invention.

FIG. 1 shows a data disc retrieval handling and storage apparatus according the present invention. In a preferred embodiment shown, there are two substantially linear data disc storage racks, generally designated 10, with data discs 12 stored therein and a substantially linear bank, generally designated 14, of data disc drives 16. A transport assembly, generally designated 18, is provided for transporting the data discs between the storage racks and the drives. The storage racks are substantially parallel to each other and to the bank of disc drives. If additional storage racks or banks are added to make a larger apparatus or the same size apparatus with smaller discs, the added storage racks and banks would also be substantially parallel as shown. Both the storage racks and the drives are oriented to receive the discs vertically.

The storage racks 10 are attached to the base plate 20 of the support frame shown in FIG. 2a. The base plate holds the storage racks stationary. The storage racks comprise end walls 22 and side walls 24. The sidewalls are fabricated from a single piece of phenolic or delran and are attached to the end walls at their ends. Each side wall has approximately one hundred twenty (120) slots 26. The slots, shown in detail in FIG. 2b, are approximately 0.078 inch wide. The fins 28 which separate the slots are approximately 0.032 inch wide.

Each disc is stored in a pair of slots between a pair of side walls. The discs contact the bottom walls 32 of the slots to hold the discs in the slots. The lower regions 31 of the slots can be curved to match the curve of the disc engaging the bottom wall 32. Thus, the discs are stored very close together in the storage racks with little wasted space. One hundred twenty (120) or more discs are stored in a storage rack only 18 inches long.

Referring back to FIG. 1, the overall length of the apparatus is 18¾ inches. The distance between the end slots 30 of the storage racks and the end of the storage racks is approximately 2⅛ inch. The width of the base plate is approximately 17⅝ inches. With these dimensions, the device fits well in a standard commercial component rack.

The bank 14 of drives 16 is preferably positioned in between the storage racks 10 providing the shortest distance of travel between the discs and the drives. Thus, the transport assembly can rapidly transfer discs between the disc drives and the storage racks. The drives are mounted to the base plate 20 with vertical mounting plates 34, and the base plate holds the drives stationary. The mounting plates are adapted to receive off the shelf drives for installation in the apparatus. One minor modification to the drives is required. The door of the off the shelf drive must be cut off, the tray to which it was attached sealed with plastic, and a microsensor is engaged in the drive to hold the tray stationary. Thus, the opening 36 of the drives is unobstructed allowing simplified insertion of discs into the drives. A loading tray 38 is also in parallel with the bank of drives. The loading tray has two pins 40, defining a disc receiving area, on which a disc inserted into the opening 39 of the loading tray can rest. The transport assembly can retrieve the disc from the disc receiving area and store the disc in a slot, and the apparatus records where the disc is stored in memory.

As already stated, the bank 14 of drives 16 the storage racks 10, and the loading tray 38 are substantially parallel to each other. Because the bank of drives, the storage racks, and the loading tray are all parallel, the transport assembly 18 can transport discs between the storage rack and the drives without changing the orientation of the discs, and it is not necessary to move the storage racks or the drives. Thus, no extra space is required to rotate the disc, and no space is used for the mechanism and drives required to rotate the discs. Further, positioning errors are avoided by not changing the orientation of the disc. This also requires less time to transfer the disc between the storage racks and the drives because no time is taken to rotate the discs. Because the drives, storage rack, and loading tray are stationary, the transport assembly can perform the fine adjustments necessary to properly position the disc, and positioning errors introduced by translating the storage racks are avoided.

Figure 3:
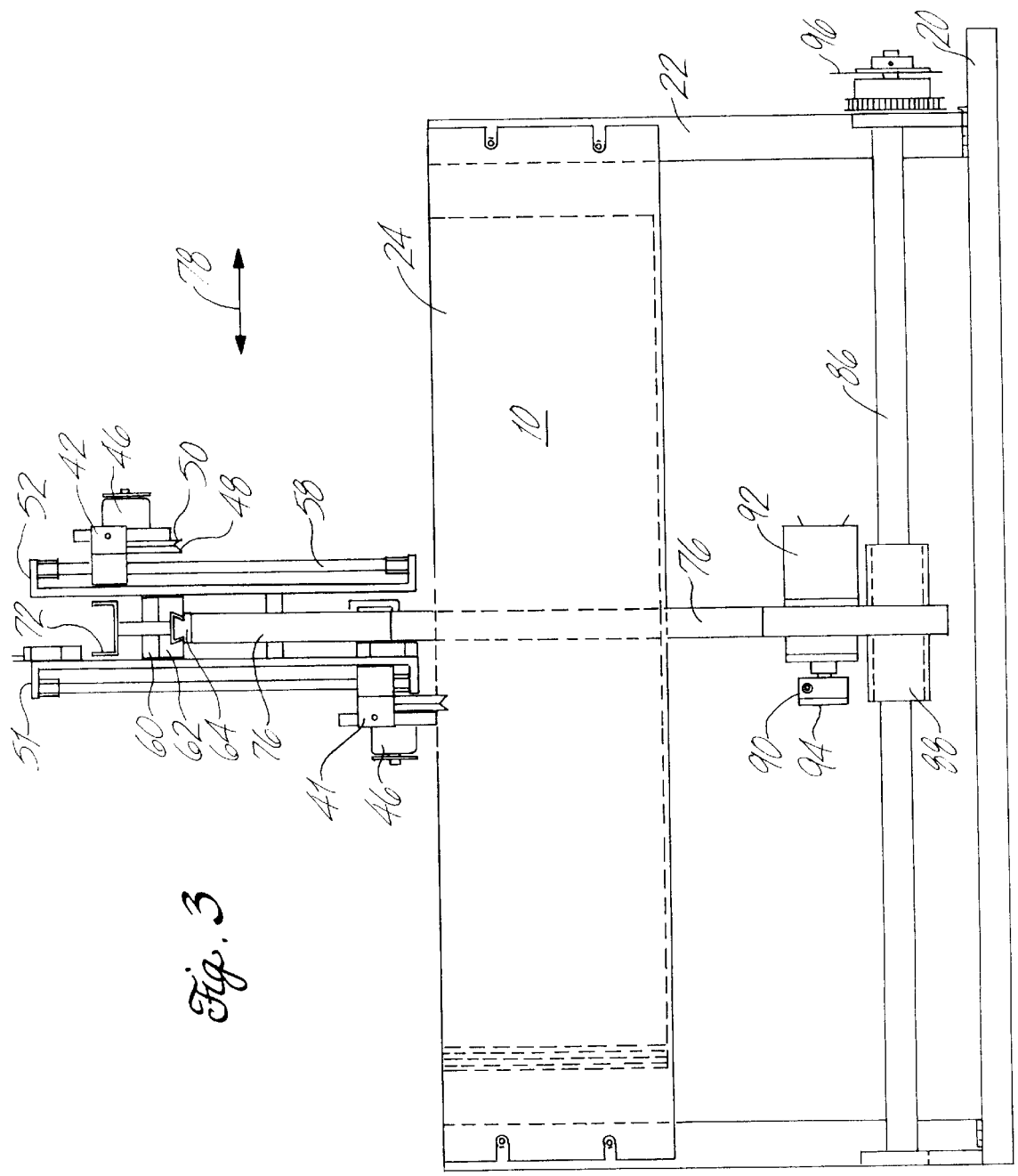
FIG. 3 is an elevational side view of the apparatus of FIG. 1 showing the transport assembly in a central position.
Figure 4:
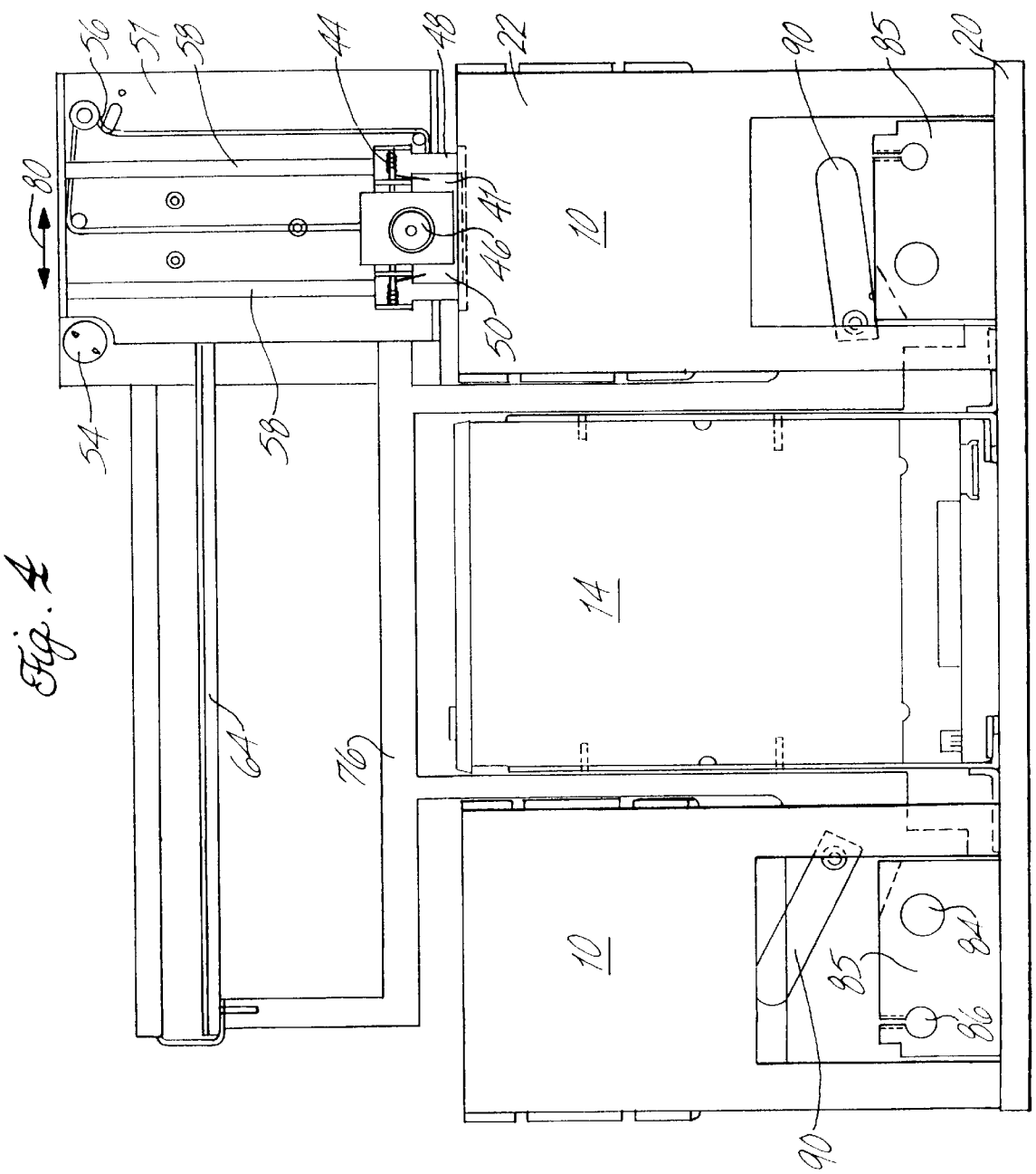
FIG. 4 is an elevational end view of the apparatus of FIG. 1 showing the transport assembly over a storage rack.

The transport assembly comprises two clamps 41, 42 which are oriented back to back as shown in FIG. 3. Referring to FIGS. 2a and 4 in addition to FIG. 3, the clamps are held shut by springs 44 and are opened by activation of a solenoid 46. Each clamp has a fixed jaw 48 and a movable jaw 50 which is moved by the solenoid. Motors utilize a belt drive 56 to translate the clamps up and down guides posts 58 which are attached to mounting brackets 51, 52. Guide channels 53 are provided on either side of the mounting bracket to guide a disc as it is translated vertically up and down by the clamp.

The mounting brackets are connected back to back with a connecting bracket 60. The connecting bracket 60 is mounted onto the top of a glide bearing 62 which slides on the transport slide 64 which allows the transport assembly to translate in a direction perpendicular to the storage racks and the bank of drives as indicated by arrow 80. A motor 66 operates this portion of the drive mechanism which is a belt drive 68 fixed to one of the mounting brackets 51 with a clasp 70. The transport assembly is also provided with a top rail 72 which holds the wiring for the transport assembly and prevents damage thereto. A tension-idler bracket 74 is also provided on the transport assembly.

The transport slide 64 is connected to a transport frame 76 which connects the transport assembly to the portion of the drive mechanism responsible for translating the transport assembly in the longitudinal direction parallel to the storage racks and the drives as shown by arrow 78. The longitudinal portion of the drive mechanism comprises a duel worm drive that is identical on both sides of the transport frame, so the longitudinal drive will be described with reference to only one half thereof.

Referring to FIGS. 1 and 2, the transport frame has a follower nut 82 that engages a rotating worm drive 84 rotatably mounted with bearings to pillow blocks 85. When the worm drive 84 is rotated, the follower nut threads up and down the worm drive thereby translating the transport assembly as shown by arrow 78. Because positioning of the transport assembly is critical to both storing the discs and placing the discs in the drives, a guide rail 86 fixed to the pillow blocks 85 with a set screw (not shown) is provided to stabilize the transport assembly. A cylindrical bearing 88 which is fixed to the transport frame engages the guide rail 86. The length of the bearing's footprint is shorter than 3 inches. Preferably, the footprint is 2⅝ inches long. For the bearing to stably guide the transport assembly and not bind with such a short footprint, several features must be combined. The transport assembly above the drives and the storage racks is kept very light and in good balance. The guide rod is carbon case hardened steel available from Bearing Engineers, Inc., at 27 Argonaut, Aliso Viejo, Calif. 92656 (714) 586-7442 and requesting part number 101-1700 HGO.500L. The bearing is a TEFLON® lined linear ball bearing also available from Bearing Engineers, Inc. Therefore, a short footprint can be obtained, thereby increasing the amount of storage space accessible by the transport assembly in a given length without the bearing binding on the guide rod.

Also mounted on the transport frame below the storage racks is a lifter arm 90, best seen in FIGS. 3 and 4, and a motor 92 or a solenoid for actuating the lifter arm. The lifter arm rotates upwardly as shown in FIG. 4 to contact the bottom of a disc in the storage racks and push the disc upwardly so that it may be clamped onto by the retrieval clamp 41. The lifter arm has a groove 94 around most of its circumference to prevent the disc from sliding off the arm.

In operation, the drive mechanism translates the transport assembly simultaneously in the direction of arrows 78 and 80. Thus, the transport assembly moves diagonally relative to the bank of drives and the storage racks. Moving diagonally, the transport assembly is positioned above the data disc to be loaded into a drive with the retrieval clamp 41 that is mounted onto the retrieval mounting bracket 51 directly above the disc. Each lifter arm is attached to the transport frame, so that it is longitudinally aligned with the retrieval clamp. Because there is only one lifter arm per storage rack, only the retrieval clamp on the retrieval mounting bracket can be used to retrieve the disc from storage. Therefore, when the retrieval clamp 41 is positioned directly above the disc the lifter arm is positioned directly below it. The lifter motor 92 then rotates the lifter arm 90, so that the groove 94 around the circumference of the lifter arm engages the bottom of the disc and pushes the disc upward. Simultaneously, the solenoid 46 is engaged, to open the clamping jaws 48, 50 against the force of the spring 44, and the clamp is translated downward by the clamp motor 54.

The clamp motor is provided with a current overload sensor which upon detecting a certain higher current than is necessary to translate the clamp on the guide racks determines that the clamp is at the bottom of the mounting bracket, and the motor shuts off. The solenoid is then disengaged clamping onto the disc. The clamp is translated upward by the motor 54. The current sensor again upon sensing an increased current shuts off the motor having determined that the clamp is at the top of the mounting bracket. The transport assembly is then translated by the drive mechanism to a position over the opening 36 of one of the drives 16. The clamp then translates downward to the bottom of the mounting bracket and releases the disc. The clamp then translates slightly upwards, closes the jaws, and translates downward pushing the disc into the disc drive so that the disc drive's internal mechanism places the disc inside the disc drive. If desirable, this step can be replaced with a software program which activates the internal mechanism of the disc drive at the approximate time. When the data disc in the drive is to be returned to its storage location, either the retrieval clamp 41 or the auxiliary clamp 42 are positioned directly over the opening of the disc drive by the transport assembly. The drive then ejects the disc pushing it upward, and one of the clamps is translated to the bottom of its mounting bracket and clamps onto the disc.

After the clamp has translated vertically upward, the transport assembly moves to a position directly above the storage location for the disc, the clamp translates the disc downward and with the aid of the guide channel replaces the disc back in its narrow slot. Once the clamp has reached the bottom of the mounting bracket the clamp opens and the disc is dropped the remainder of the distance into the slot. The disc is not damaged by the ¼ inch to ¾ inch drop back into the slot.

Referring to FIGS. 3 and 2a, the position of the transport assembly is constantly monitored by a linear encoder 96 and encoder sensor (not shown) mounted to one end of the worm shaft. To prevent compounding of position sensing errors, a positioning sensor 100 is attached to the base plate 20. Periodically a pin (not shown) which is attached to the transport assembly is translated into the positioning sensor 100. When the sensor 100 is engaged, the position of the transport assembly is zeroed.

To assure that the data discs are completely inserted into the slots, an infrared sensor (not shown) and an infrared sender 102 are provided at opposite ends of the storage racks just above the normal level of the data discs in storage. If the infrared beam is blocked after the transport assembly has released the disc into the storage slot, the transport assembly will be frozen in place and an error message delivered to the operator to prevent damage to the disc from the transport assembly.

When all six disc drives are in use at once, and an operator selects a different data disc, the transport assembly is moved to the storage rack directly above the new data disc and retrieves the new data disc with the retrieval clamp. The transport assembly then translates to the disc drive in which the new data disc is to be inserted, and the auxiliary clamp removes the data disc to be stored from the drive. The transport assembly then translate longitudinally so that the new disc held by the retrieval clamp is directly over the opening of the drive and inserts the disc into the drive. The transport assembly may then return the disc held by the auxiliary clamp to its storage location. This operation, made possible by the back to back clamps, substantially reduces the amount of time between disc selection and disc playing when all the drives are in use.

When an operator desires to add a new data disc to the collection, the data disc is placed into the opening of the loading tray and allowed to rest on the pins in the disc receiving area. The transport assembly then picks up the data disc, translates the data disc to an open storage location, and inserts the data disc in the open pair of storage slots. The position of the new data disc is recorded by the apparatus.

Thus, a data disc handling, retrieval, and storage apparatus is disclosed which utilizes parallel storage racks and a bank of disc drives with a transport assembly to more efficiently store data discs in less space and effect their retrieval for use. While embodiments and applications of this invention have been shown and described, it would be apparent to those skilled in the art that many more modifications are possible without departing from the inventive concepts herein.

For example, modifying the storage racks or disc drives so that they are slightly out of parallel or slightly non-linear is equivalent to the disclosed arrangement. Further, the apparatus and method can be applied to any size of disc, other known storage mechanisms, and storage mechanisms not yet developed. It is, therefore, to be understood that within the scope of the appended claims, this invention may be practiced otherwise than as specifically described.

What is claimed is:

1. A disc handling apparatus comprising:

a support frame;

first and second linear parallel disc storage racks attached to the support frame, the racks defining compartments for storing discs in parallel vertical planes so the compartments open upwardly for disc access and the discs move vertically to enter and exit the compartments;

a linear bank of disc drives attached to the support frame between the racks, the disc drives having slots for receiving discs in vertical planes parallel to the planes in which the discs are stored in the compartments, the disc drive slots opening upward so the discs move vertically to enter and exit the slots;

a disc transport mechanism mounted on the support frame so it is translatable in a horizontal plane that lies above the upwardly opening compartments and slots, the disc transport mechanism including means for moving a disc vertically into and out of one of the compartments and one of the disc drive slots; and means for translating the transport mechanism in a horizontal plane to carry a disc between a selected compartment and a selected disc drive; said means for moving a disc vertically includes lifting means associated with each rack and disposed thereunder so as to engageable with a disc edge for lifting a selected disc vertically, wherein said disc transport mechanism is vertically supported by a plurality of horizontal rails disposed beneath the racks; and said means for moving a disc vertically are integrally provided on a bottom portion of said disc transport mechanism and are horizontally translatable therewith.

2. The apparatus of claim 1, in which the transport mechanism comprises, a cross member that slides on the rails in one direction, and a disc carrying member that slides on the cross member in the other direction so the disc carrying member can move diagonally in a horizontal plane relative to the racks and the bank of disc drives.

3. The apparatus of claim 2, in which the disc carrying member comprises a clamp capable of closing to grasp a disc and opening to release a disc.

4. The apparatus of claim 3, in which the rails lie under the racks and the cross member and the clamp lie above the racks.

5. The apparatus of claim 4, in which the disc carrying member additionally comprises means for moving the clamp vertically between a lowered position directly above the compartments and a raised position spaced upwardly from the compartments, the clamp being in the raised position while the transport mechanism is translating and being in the lowered position while discs are being removed and received by the compartments and the disc drives.

6. The apparatus of claim 5, in which the lifting means comprises a disc lifter arm that lies under the racks in alignment with the clamp so as to raise a disc out of its compartment into engagement with the clamp when the clamp is in the lowered position during removal of the disc from the rack.

7. The apparatus of claim 6, in which the clamp releases a disc when the clamp is in the lowered position during return of the disc to the rack.

* * * * *